United States Patent
Sabol, Jr.

(10) Patent No.: US 6,264,527 B1
(45) Date of Patent: Jul. 24, 2001

(54) MULTI-VOICED TURKEY CALL AND IMPROVED SOUNDER BOARD ARRANGEMENT TO SIMULATE YOUNG TURKEY CALLS

(76) Inventor: George J. Sabol, Jr., 311 E. Oriole Dr., Larksville, PA (US) 18704-1616

( * ) Notice: Subject to any disclaimer, the term of this patent is extended or adjusted under 35 U.S.C. 154(b) by 0 days.

(21) Appl. No.: 09/410,904

(22) Filed: Oct. 2, 1999

(51) Int. Cl.$^7$ .................................................. A63H 5/00
(52) U.S. Cl. ....................................................... 446/397
(58) Field of Search ................................. 446/397, 404, 446/418, 489, 402, 408, 419–422; 84/402, 404, 410; 43/2; 220/676; 217/62

(56) References Cited

U.S. PATENT DOCUMENTS

| | | | |
|---|---|---|---|
| 651,752 | 6/1900 | Draughon . | |
| 1,034,307 | 7/1912 | Saunders . | |
| 1,449,756 | 3/1923 | Jackson . | |
| 1,655,291 | 1/1928 | Pilchler . | |
| 2,025,181 | 12/1935 | Simon | 46/189 |
| 2,606,401 | 8/1952 | Boatwright | 46/189 |
| 2,642,699 | 6/1953 | Green | 46/189 |
| 2,643,483 | 6/1953 | Walker | 46/189 |
| 2,720,054 | 10/1955 | Grazier | 46/189 |
| 2,958,157 | 11/1960 | Tannehill | 46/177 |
| 3,100,948 | 8/1963 | Tax | 46/189 |
| 3,129,527 | 4/1964 | Williams | 46/177 |
| 3,208,184 | 9/1965 | Wisor | 46/189 |
| 3,367,064 | 2/1968 | Anthony et al. | 46/189 |
| 3,927,490 | 12/1975 | Grayson | 46/189 |
| 4,003,159 | 1/1977 | Piper | 46/189 |
| 4,041,639 | 8/1977 | Funk | 46/189 |
| 4,343,108 | 8/1982 | Lee | 46/189 |
| 4,387,531 | 6/1983 | Jacob | 46/189 |
| 4,422,262 | 12/1983 | Moss | 46/189 |
| 4,606,733 | 8/1986 | Willis | 446/397 |
| 4,648,852 | 3/1987 | Wingate | 446/397 |
| 4,662,858 | 5/1987 | Hall | 446/397 |
| 4,836,822 | * 6/1989 | Finley et al. | 446/397 |
| 4,854,914 | 8/1989 | White | 446/402 |
| 4,988,325 | 1/1991 | Alderson et al. | 446/397 |
| 5,066,260 | 11/1991 | Lindler | 446/397 |
| 5,484,319 | 1/1996 | Battey | 446/397 |
| 5,503,585 | * 4/1996 | Heineman | 446/397 |
| 5,529,526 | 6/1996 | Wesley | 446/397 |
| 5,562,521 | 10/1996 | Butler et al. | 446/397 |
| 5,716,254 | 2/1998 | Bowes | 446/397 |

OTHER PUBLICATIONS

"Turkey Callmakers Past and Present, Mick's Picks Stories and History of Callmakers" by Eral Mickel, p. 48.
"Spring Turkey Hunting, The Serious Hunter's Guide" by John M. McDaniel, pp. 160 and 161.

* cited by examiner

*Primary Examiner*—Jacob K. Ackun, Jr.
*Assistant Examiner*—Urszula M. Cegielnik
(74) *Attorney, Agent, or Firm*—Harold I. Masteller, Jr.

(57) ABSTRACT

The invention is directed to a multi-voiced friction call comprising a sound box frame having a flexible top sounder board arrangement that generates a simulated high pitched young turkey call when a striker rubbed across its friction surface in combination with a bottom sounder board that generates a lower pitched adult turkey call when a striker rubbed across its friction surface, and a sound chamber arrangement that increases the volume of the generated turkey sounds.

23 Claims, 6 Drawing Sheets

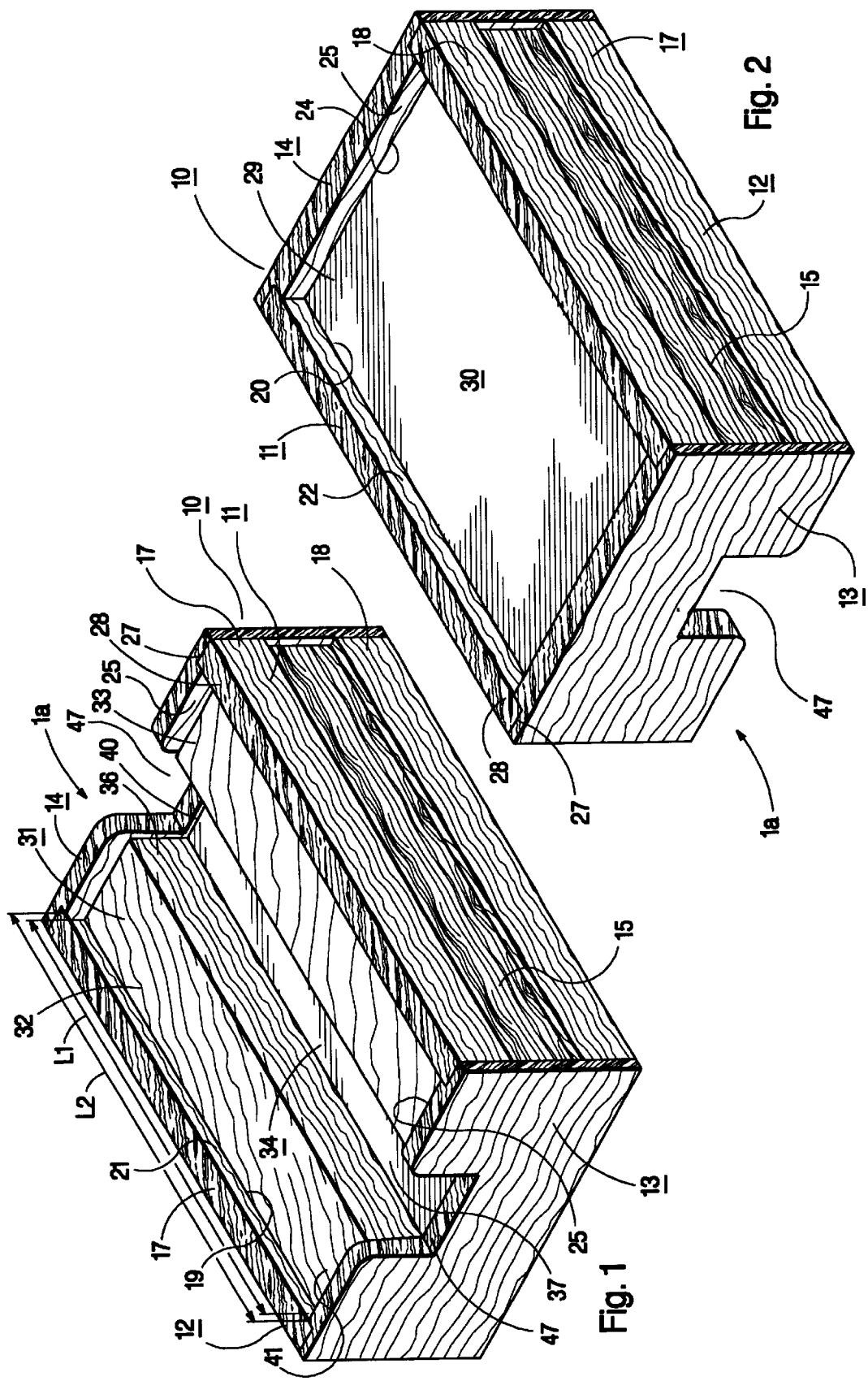

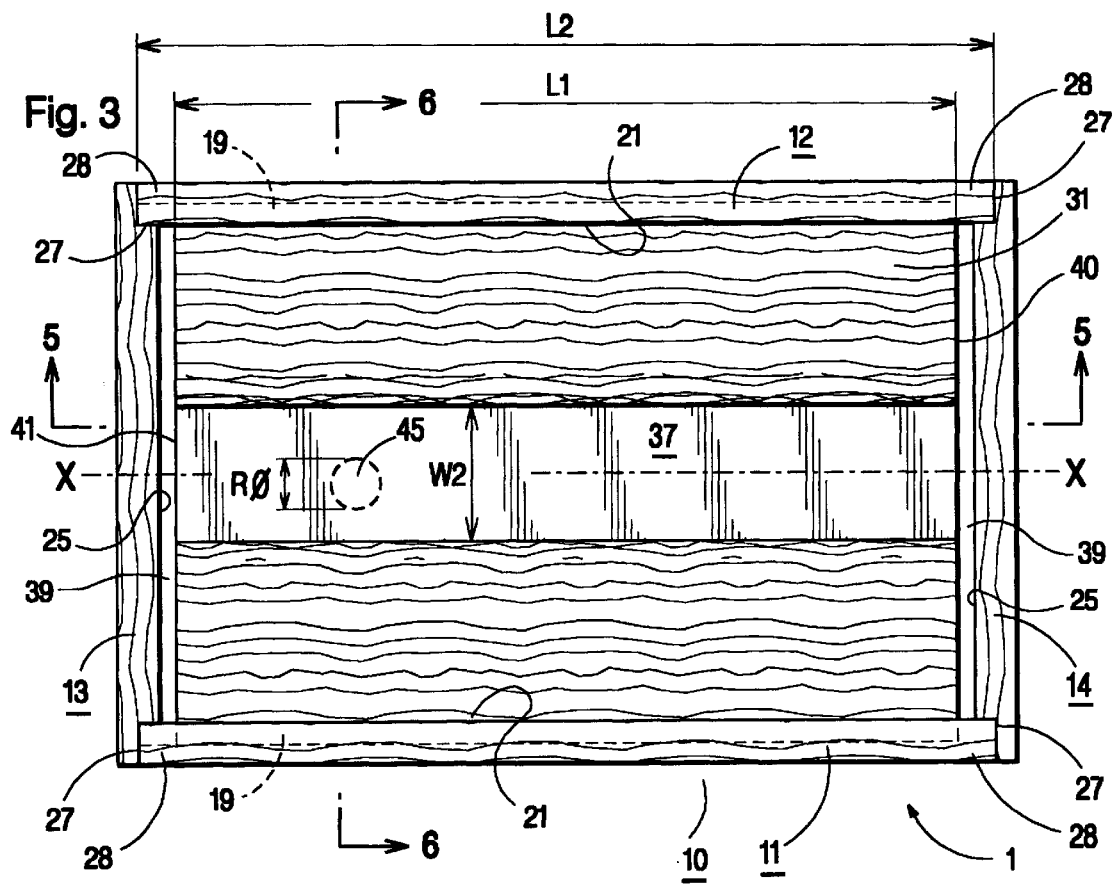
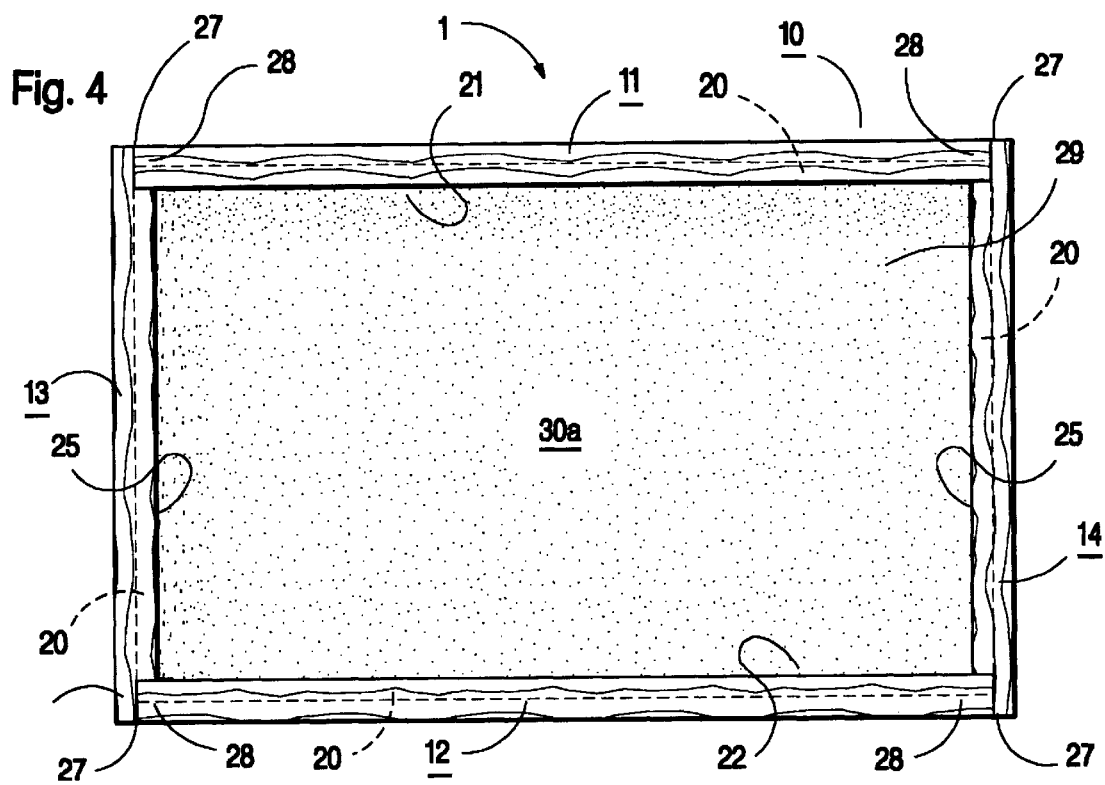

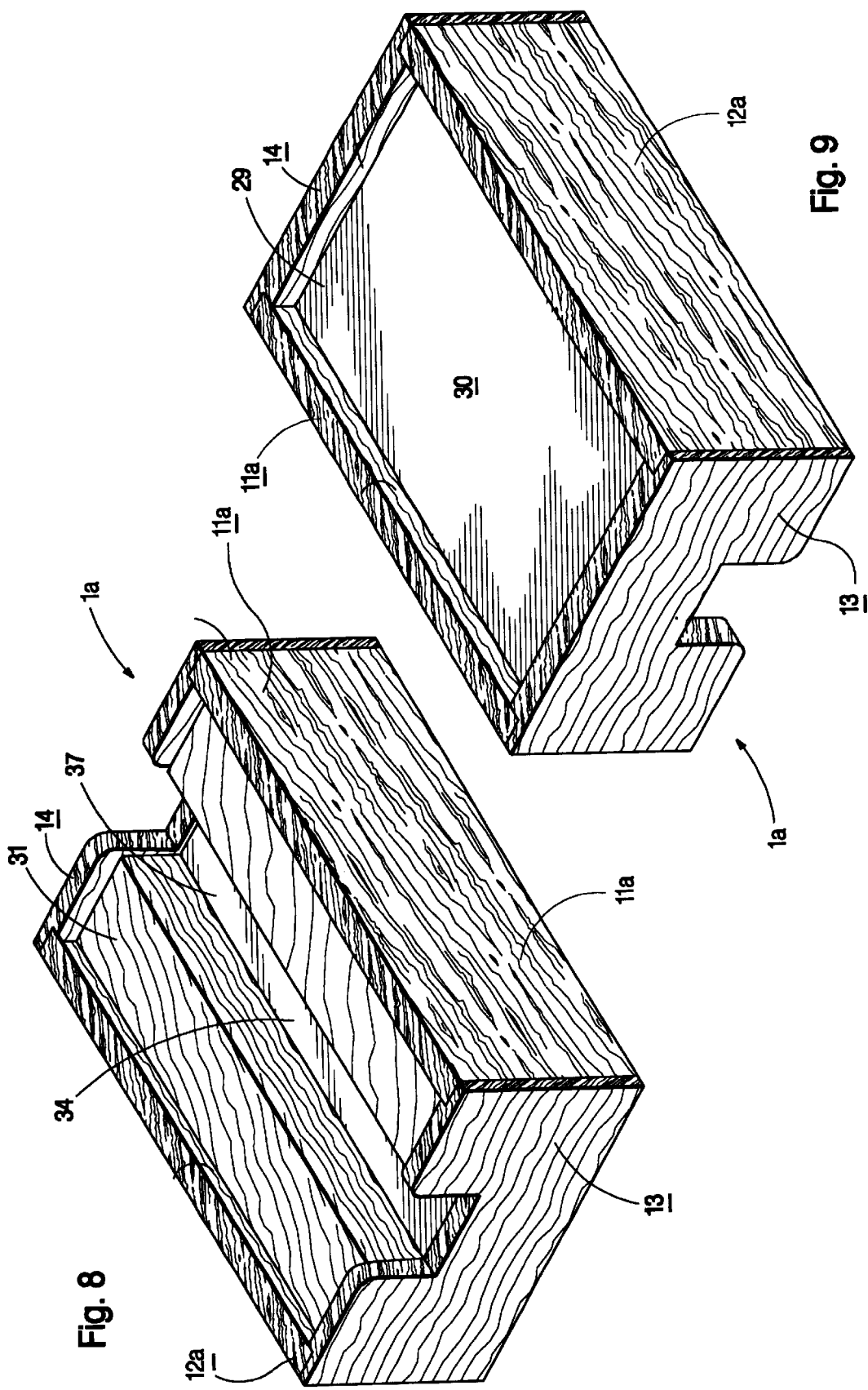

MULTI-VOICED TURKEY CALL AND IMPROVED SOUNDER BOARD ARRANGEMENT TO SIMULATE YOUNG TURKEY CALLS

FIELD OF THE INVENTION

This invention is directed to a friction type turkey call, and in particular, to a multi-voiced friction call having an improved sounder board that acoustically enhances and simulates the high pitched calls; yelps, clucks, etc., that are produced by young turkeys, in combination with a sounder board that simulates the lower pitched calls; yelps, clucks, etc. made by adult gobblers and hens.

BACKGROUND OF THE INVENTION

Turkey calls fall into three broad classifications, friction calls, diaphragm calls, and trumpet calls. Friction calls produce an audible sound when a striker is pushed or rubbed along the surface of their friction plate or sounder board. For example, U.S. Pat. Nos. 1,034,307 to Saunders, 3,367,064 to Anthony, et al., 4,003,159 to Piper, and 4,904,221 to Taylor, disclose friction calls and teach pushing or rubbing a striker across the surface of a hand held friction plate to produce an audible sound that simulates gobbler and hen turkey sounds; the sounds being described as "yelps and clucks." Such hand held friction plates are problematic for users trying to create sounds that imitate wild turkey calls. They are especially problematic for beginners having low levels of calling and hunting skills. This is because the user must grasp the friction plate in one hand while they push or rub a striker along the surface of the friction plate. This procedure is clearly illustrated in the different drawing figures shown in the Saunders, Anthony, et al., and Taylor patents. Grasping a friction call, as taught in the past tends to dampen the acoustic vibrations that are created when a striker is rubbed across the friction surface of the call. Although skilled callers know how to cup the call in their hand to lessen such dampening effects, less skilled users tend to produce distorted and ineffective turkey calls when using such devices.

Such sound dampening problems have been somewhat overcome through the development and manufacture of hand held box type friction calls. Hand held box type friction calls include a friction plate or sounder board that is attached, either internal or external to the box structure, in a fashion that isolates the friction plate from the user's handgrip when the friction plate is rubbed by a striker to generate a simulated turkey sound. Examples of such past hand held friction call devices are disclosed in U.S. Pat. Nos. 1,449,756 to Jackson, 2,643,483 to Walker, 2,720,054 to Grazier, 4,041,639 to Funk, 4,310,986 to Jacobs, 4,606,733 to Willis, 4,648,852 to Wingate, 5,066,260 to Linder, and 5,484,319 to Battey. As mentioned above, past box type friction calls attempt to overcome dampening problems by isolating the sound generating surface from the user's hand. However, the friction calls that are available on today's market tend to have one or more of the following problems. First, the sound vibrations continue to be somewhat dampened when a user grasps the flat-sided frame of box 10 as clearly illustrated in FIG. 2 of the Willis patent. Such flat construction prevents the sound box from vibrating and reduces volume and tone quality when held tightly in a user's hand. Second, today's state-of-the-art friction calls limit the user to a single basic turkey sound pattern. This requires a hunter to carry more than one turkey call if he or she desires to simulate a selection of different turkey sounds. Third, some past friction calls securely fasten all four sides of the friction plate, or sounder board, to the frame of the box. This limits sounder board flexibility and reduces vibrational response to the striker being rubbed across its friction surface. Fourth, some friction calls house the friction surface deep within an interior chamber of the box. This enclosed type of construction traps sound vibrations within the sound chamber and reduces volume and tone quality. Finally, friction calls of the past fail to provide the user with a sounder board that makes it easy to produce the higher pitched calls; yelps, clucks, etc., of young birds. Such higher pitched sounds are particularly important during the fall season when a hunter scatters a flock of turkeys. Scattered birds can be more easily called back by imitating high-pitched sounds of a young turkey. Such high pitched sounds were not easily available to hunters, photographers, and the like using friction calls of the past.

SUMMARY OF THE INVENTION

It is therefore the first object of this invention to provide an improved friction call having a flexible sounder board to enhance the vibrational response to a striker rubbed across its friction surface.

It is a further object of this invention to provide an improved friction call sound box that facilitates transmitting sound vibrations outward from its interior sound chamber.

It is an additional object of this invention to provide a friction call sound box that enhances sound vibrations and tone quality by reducing hand contact.

It is still a further object of this invention to provide an improved friction call that simulates high-pitched calls made by young turkeys.

It is still a further object of this invention to provide an improved box type friction call that provides a multiplicity of turkey call sound patterns.

In satisfaction of the foregoing objects and advantages, the present invention provides a multi-voiced friction call comprising a sound box frame having a flexible top sounder board arrangement that generates a simulated high pitched young turkey call when a striker rubbed across its friction surface in combination with a bottom sounder board that generates a lower pitched adult turkey call when a striker rubbed across its friction surface, and a sound chamber arrangement that increases the volume of the generated turkey sounds.

BRIEF DESCRIPTION OF THE DRAWINGS

FIG. 1 is an isometric view showing the top sounder board of the preferred box type friction call device of the present invention.

FIG. 2 is an isometric view showing the bottom sounder board of the preferred friction call device of the present invention.

FIG. 3 is a top plan view of the friction call shown in FIG. 1.

FIG. 4 is a bottom plan view of the friction call shown in FIG. 1.

FIG. 8 is a top isometric view showing an alternate friction call embodiment having flat side-pieces.

FIG. 9 is a bottom isometric view of the alternate friction call embodiment shown in FIG. 8.

DETAILED DESCRIPTION OF THE EMBODIMENT

Figure 5:
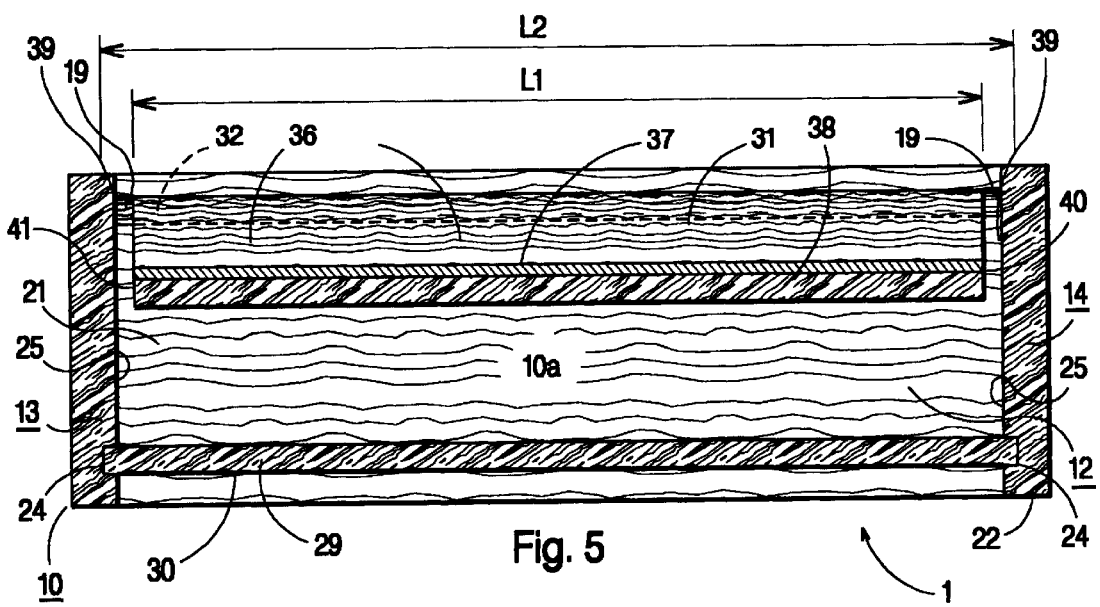
FIG. 5 is a cross-section view taken along the lines 5—5 of FIG. 3.
Figure 6:
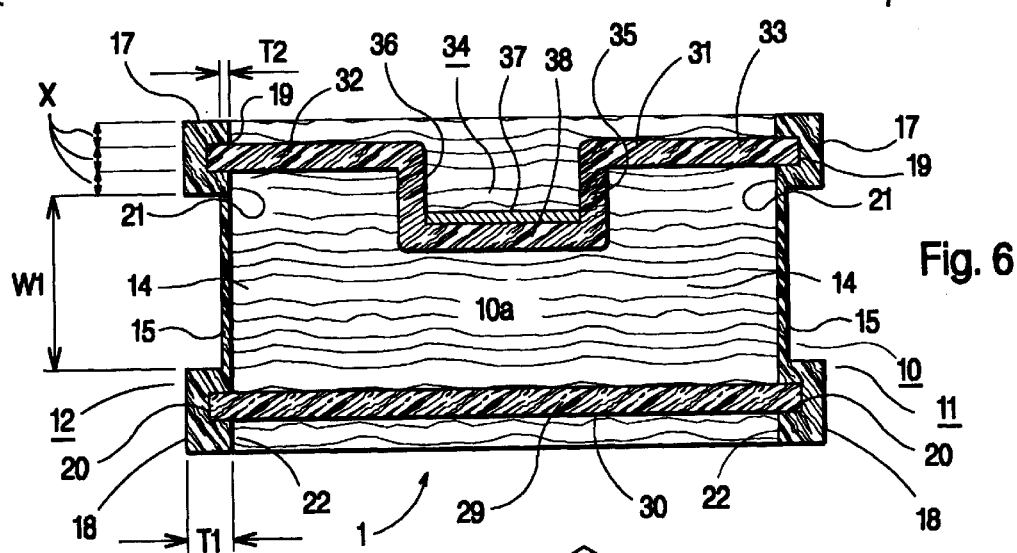
FIG. 6 is a cross-section view taken along the lines 6—6 of FIG. 3.

Referring to FIGS. 1–6 of the drawings, the preferred box type friction call embodiment 1 of the present turkey call invention comprises a sound box 10 and chamber 10a having a frame that includes spaced apart side-pieces 11 and 12 and spaced apart end caps 13 and 14. Each side-piece 11 and 12 has a thin panel 15 portion positioned between thicker top and bottom side-rails 17 and 18 that extend along the length of the side-pieces 11 and 12. Each side-piece further includes a top groove 19 that extends along the inside surface 21 of the top side-rail 17, and a bottom groove 20 that extends along the inside surface 22 of the bottom side-rail 18. Referring in particular to FIG. 6, each a top and bottom side rail members 17 and 18, has a rail thickness "T1" of about 3/16", and each panel 15 has a panel thickness "T2" of about 1/16×". It has been discovered that when friction call 1 is manufactured with side-piece panels 15 having a preferred width "W1" of about a 5/8" and a preferred thickness "T2" of about 1/16",the resulting panel geometry will contribute an improvement in acoustic response to striker stimulus; the contribution producing a bigger volume and more realistic young turkey tone quality as compared to the same friction call without the preferred panel 15 geometry. Tests have shown that panel 15 widths "W1" ranging between about 3/8" to 3/4" wide can be used to produce an acceptable volume and tone. However, the same tests have also shown that a most improved loud volume, and more realistic young turkey sound, is produced when the side-pieces 11 and 12 include a panel 15 that is 1/16" thick and 5/8" wide, in combination with a 3/16" top rail having a 1/8" wide top groove 19 positioned between 1/8" top rail segments shown as "X" (FIG. 6). It has been discovered that, as panel 15 widths "W1" move away from the preferred 5/8" size, either toward a larger or smaller "W1", the sound and tone quality of the friction call is diminished. Referring again to FIG. 6, the top and bottom side-rails 17 and 18 protrude outward from panel 15 in a configuration that offsets the panel toward an inward direction from the rails, and thereby, isolating the thinned side-piece panel 15 from the user's hand. This offset prevents a user's hand from dampening the acoustic vibrations along panel 15 when a striker rod is rubbed against either the top sounder board 31 or the bottom sounder board 29. As a result, the better resonating panel 15 enriches the tone quality of the call.

Each spaced apart end cap 13 and 14 includes a groove 24 that corresponds to the bottom grooves 20 in the bottom side-rails of side-pieces 11 and 12. Groove 24 extends along the inside surface 25 of each end cap. End caps 13 and 14 further includes a rabbet joint 27 (FIGS. 1–2) along opposite sides of the cap. The rabbet joint 27 is adapted to receive ends 28 of the side-pieces 11 and 12 to form a sound box 10 when the side-pieces and end caps are connected together, for example by gluing.

Grooves 20 and 24 are aligned and adapted to receive a bottom sounder board 29 that also provides the bottom panel portion of the sound box 10. The bottom sounder board is captured within grooves 20 and 24, and sounder board 29 includes a friction surface 30 along its outside face (FIGS. 2, 5 and 6). In the preferred embodiment, the sounder board is a slate material that emits a cluck or yelp when a striker is rubbed across the slate surface 30, the cluck or yelp simulating the sound of an adult wild turkey. However, any suitable friction material may be used for the bottom sounder board as long as the material is capable of producing a desired sound that simulates a wild turkey. By way of illustration, FIG. 4 shows a bottom sounder board comprising an alternate friction material 30a that is different from the friction material 30 shown in FIG. 2. Such alternate materials may include, for example, sandblasted glass, wood, metal, plastic or the like.

Grooves 19, extending along side-piece 11 and side-piece 12, are aligned in a parallel plane to each other, and the grooves are adapted to receive a top sounder board 31. As more clearly shown in FIG. 6, top sounder board 31 comprises a pair of spaced apart flanges 32 and 33 that are captured within grooves 19 of the side-pieces 11 and 12, for example by gluing, and a "U" shaped sounder portion 34 that extends along the longitudinal axis X—X (FIG. 5) of the top sounder board. The "U" shaped sounder portion 34 extends between, and in a downward direction from, flanges 32 and 33 by legs 35 and 36. A friction material 37 is fastened by an adhesive or other suitable means to the top surface of the horizontal member 38 that extends between legs 35 and 36. The friction material 37 is selected to emit the higher pitched sound that imitates a young turkey when the sounder board 31 is properly attached to the friction call as disclosed herein. Additionally, the width of the friction material 37 is less than the distance between the spaced apart legs 35 and 36. The strip of friction material is purposely undersized to avoid forcing the strip of friction material 37 into the wooden trough 34 between legs 35 and 36. Such a force fit would interfere with the transmission of sound vibrations through the strip of friction material and wood portion at the bottom of trough 34, and into the body of the sound box 10 that acts as a sound chamber. A strip of friction material that is too wide or force fitted into trough 34 cancels out the parabolic effect of the top sounder board and results in a flat sounding call when rubbed with a striker.

Referring to FIGS. 1, 3, and 5, the top sounder board 31 has a length "L1" that is shorter than the distance "L2" extending between the opposed inside surfaces 25 of the spaced apart end caps 13 and 14. The difference in length between L1 and L2 creates a slot 39 that functions as a sound hole opening located at each end of the friction call 1 between the top sounder board 31 and the end caps 13 and 14. It has been discovered that the slots 39 improve sounder board flexibility by way of the unsupported sounder board ends 40 and 41. The unsupported sounder board ends enable the top sounder board 31 to vibrate at a frequency that simulates the higher pitched yelp, or cluck call of a young turkey when a striker rod 45 (FIG. 7) is rubbed across the surface of the strip of friction material 37. In the preferred embodiment, the friction material 37 is an aluminum strip fixed to the horizontal member 38 of the top sounder board 31. However, any friction material may be used in combination with slots 39 and the unsupported sounder board ends 40 and 41 as long as the combination material and mounting arrangement produces the desired higher pitched sound that simulates a young turkey. For example, tests have shown that different friction materials can be used to produce a high pitched sound that somewhat imitates a young turkey. However, testing has also shown that if the friction call 1 includes the preferred aluminum friction material 37 along the sounder board 31, but does not include slots 39, and/or the unsupported sounder board ends 40 and 41, the friction call will fail to produce the desired young turkey call sound.

Figure 7:
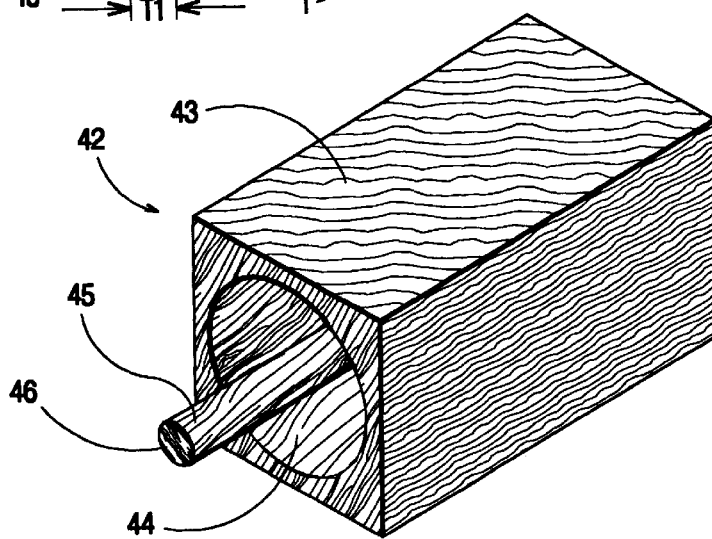
FIG. 7 is an isometric view of a typical striker used with friction calls.
Figure 10:
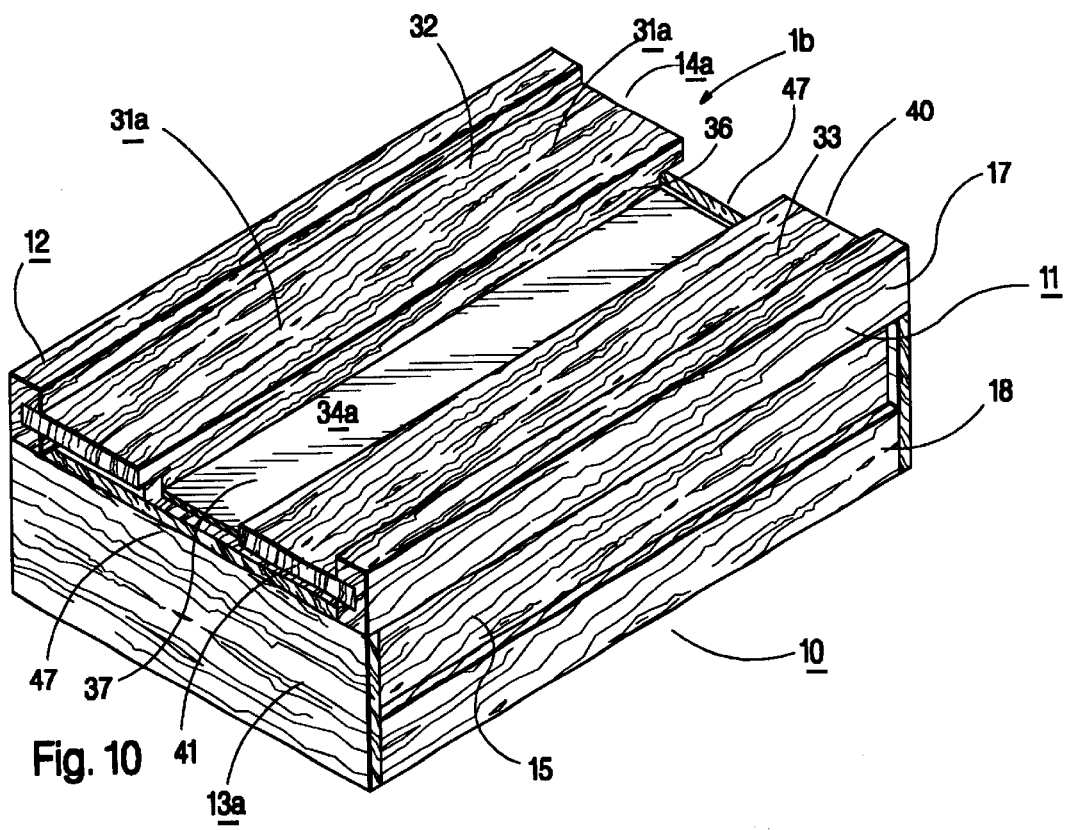
FIG. 10 is a top isometric view showing a second alternate embodiment of the present friction call invention.
Figure 11:
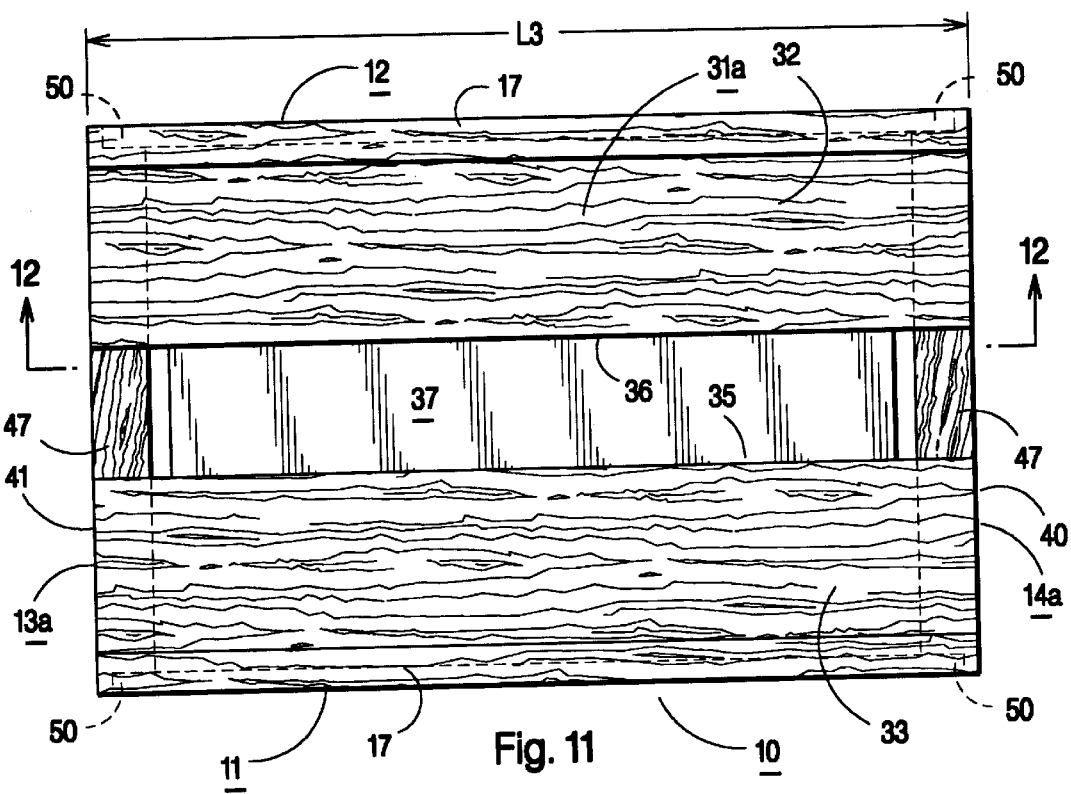
FIG. 11 is a top plan view of the friction call shown in FIG. 10.
Figure 12:
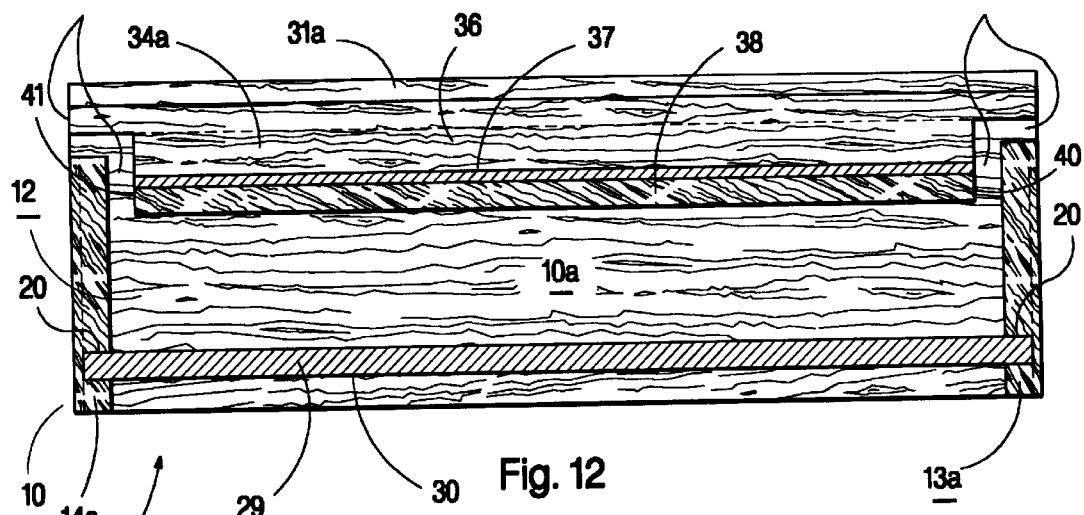
FIG. 12 is a cross-section view taken along the lines 12—12 of FIG. 11.
Figure 13:
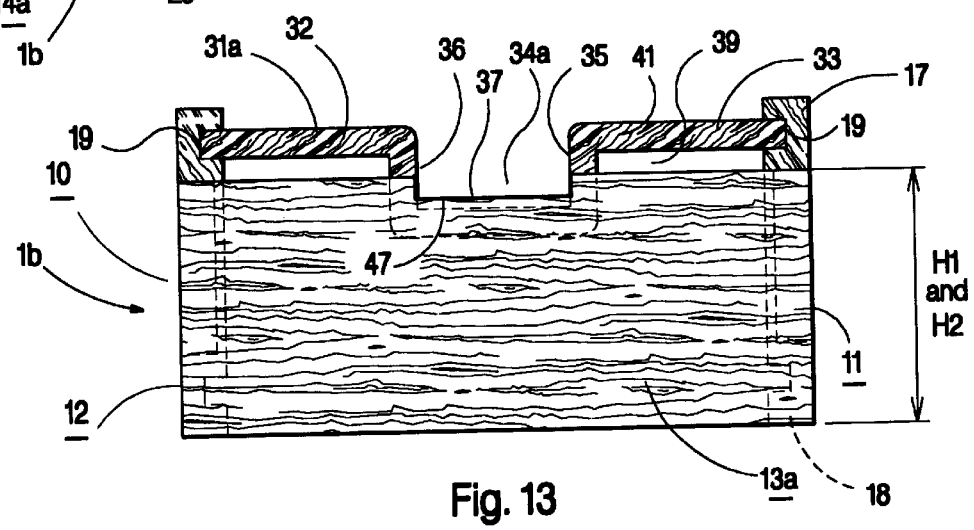
FIG. 13 is an end elevation view of the alternate friction call embodiment shown in FIGS. 10–12.

Referring to FIG. 7, a typical friction call striker 42 includes a handle portion 43 that includes a cavity 44 having a striker rod 45 secured therein. Striker rod 45 extends outward from cavity 44 at a length that is convenient for the user to grasp handle 43 and rub the tip 46 of the striker rod against one of the friction surfaces provided in the box type friction call 1.

During testing different embodiments of the present invention, it was discovered that a critical relationship exists between the diameter "RØ" of the striker rod 45 and the trough width "W2", a distance between the spaced apart legs 35 and 36 as shown in FIG. 3. In the preferred embodiment, "W2" is ¾" and "RØ" is ¼" giving a trough width to striker rod diameter ratio W2/RØ=2.5. This W2/RØ ratio is important in order to provide sufficient room within trough 34 to rub the striker rod in a preferred circular motion across the surface of friction strip 37. Although any rubbing motion can be used to generate a sound vibration in the top sounder board 31, a circular rubbing motion is necessary for generating certain sound vibrations that imitate a young turkey. This critical W2/RØ ratio is not recognized in prior friction calls.

During testing different embodiments of the present invention, it was discovered that a critical relationship exists between the diameter "RØ" of the striker rod 45 and the trough width "W2", a distance between the spaced apart legs 35 and 36 as shown in FIG. 3. In the preferred embodiment, "W2" is ¾" and "RØ" is ¼" giving a trough width to striker rod diameter ratio W2/Ø=2.5. This W2/RØ ratio is important in order to provide sufficient room within trough 34 to rub the striker rod in a preferred circular motion across the surface of the strip of friction material 37. Although any rubbing motion can be used to generate a sound vibration in the top sounder board 31, a circular rubbing motion is necessary for generating certain sound vibrations that imitate a young turkey. This critical W2/RØ ratio is not recognized in prior friction calls. For example, the Piper call was tested and compared with the improved sound of the present friction call invention. It was discovered that the narrow friction surface and trough width provided in such calls makes it nearly impossible to generate good quality sound tone because the narrow widths prevent effective striker rod motion.

Referring to FIGS. 1 and 2, clean-out notches 47 may be provided in each end cap 13 and 14. Clean-out notches 47 are provided for user convenience in maintaining and dressing the surface of the friction material 37. The clean-out notches are formed to correspond to, and align with, the "U" shaped sounder 34 that extends along the longitudinal X—X axis (shown in FIG. 5), of the top sounder board. Notches 47 provide convenient means for wiping dirt and debris from the surface of the friction surface 37. However, it should be understood that a turkey call may be constructed with or without clean-out notches 47 (FIG. 4) without departing from the scope of this invention.

Actual construction, and testing of different friction calls of the present invention, and actual comparison of the present invention against the volume and sound quality of prior friction calls, has resulted in the surprising discovery that each of the heretofore disclosed improvements, if tested alone, contribute a volume and tone quality improvement over the tested prior calls. However it was also discovered that the preferred embodiment of FIGS. 1–6 comprising a combination of all the disclosed improvements, produced the most improved louder volume and higher pitched tone quality when compared to the tested different improved embodiments and when compared to the tested prior friction calls. For example, the most improved volume and tone quality was produced from a box type friction call comprising a panel 15 having a preferred width "W1" and preferred thickness "T2", a flexible sounder board 31 having unsupported sounder board ends 40 and 41, slots or sound holes 39 to emit sound waves from the chamber of sound box 10, and a sounder board trough having a W2/RØ=2.5 ratio.

Referring to FIGS. 8 and 9 an alternate embodiment 1a of the present turkey call invention is shown comprising two friction surfaces 30 and 37 for generating sounds that simulate calls of wild turkey gobblers, hens and young turkeys when a striker is rubbed across the surface thereof. The alternate turkey call includes alternate flat or planer side-pieces 11a and 12a, end caps 13 and 14, a bottom sounder board 29 having a friction surface 30, and a top sounder board 31 comprising a "U" shaped sounder portion or trough 34 having a friction surface 37. The alternate side-pieces 11a and 12a do not include either side-rails or a thinned wall panel portion as shown in FIG. 6 of the preferred embodiment. During testing of the alternate embodiment 1a, it was discovered that the top sounder board 31 produced a louder volume and a more realistic young turkey call when compared to prior friction calls, and in particular, when compared to the friction call disclosed by Piper in U.S. Pat. No. 4,003,159, and the friction calls disclosed in "TURKEY CALLMAKERS Past and Present" by Mickel, page 48, and in "SPRING TURKEY HUNTING" by McDaniel, page 161. However, even though the flat side-piece embodiment 1a improves sound quality and volume over these prior friction calls, the flat side-piece call fails to produce the loud volume and improved high pitched sound quality of the preferred embodiment of the present invention shown in FIGS. 1–6.

Referring now to still another alternate embodiment of the present friction call invention, FIGS. 10–13 show an alternate box type friction call 1b having a sound box 10 comprising side-pieces 11 and 12, alternate end caps 13a and 14a, a bottom sounder board 29 having a friction surface 30, and an alternate top sounder board 31a including a "U" shaped sounder portion or trough 34a and friction surface 37. The alternate top sounder board 31a has a length "L3" equal to the full length of sound box 10, and unsupported sounder board ends 40 and 41 similar to the preferred embodiment shown in FIGS. 1–6. Sounder board 31a also includes spaced apart flanges 32 and 33 that are captured within grooves 19 similar to FIGS. 1–6, and a "U" shaped trough 34 that extends downward into the sound chamber 10a by legs 35 and 36. The "U" shaped trough also has a length "L3" equal to the length of sound box 10. A friction material 37 is fastened, by adhesive or other suitable means, to the top surface of the horizontal member 38 that extends between legs 35 and 36 as heretofore disclosed. The bottom sounder board 29 is held in place along the grooves 20 as described in the preferred embodiment, and the end caps 13a and 14a are fitted by a rabbit joint 50, as shown by dotted lines in FIG. 11, to the opposite ends of the side-pieces 11 and 12 to complete the six sides of the sound box 10. The end caps 13a and 14a include clean-out notches 47 and the height "H1" of each end cap is equal to or less than the height "H2" extending from the bottom edge of the side rails 18 to the bottom edge of the top side rails 17. This creates a slot, or sound hole 39 that communicates with the sound chamber 10a within sound box 10 and provides for unsupported ends sounder board 40 and 41 in the top sounder board 31. Alternate embodiment 1b includes all the improvements of the present friction call invention. For example, a panel 15 having a preferred width "W1" and preferred thickness "T2", a flexible sounder board 31 having unsupported sounder board ends 40 and 41, slots or sound holes 39 to emit sound waves from the chamber of sound box 10, and a sounder board trough having a W2/RØ=3 ratio. Therefore, the box type friction call 1b produces a volume and sound quality equal or nearly the same and the volume and sound quality produced by the preferred embodiment disclosed in FIGS. 1–6.

Figure 14:
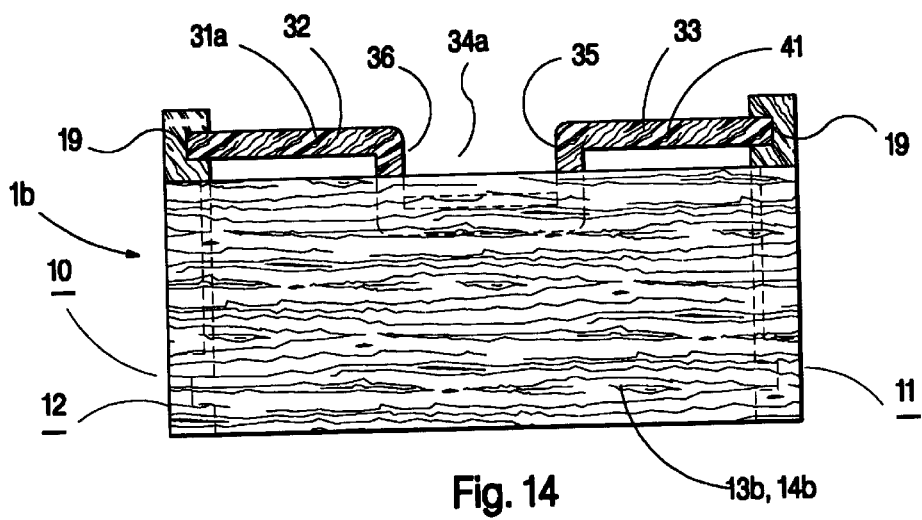
FIG. 14 is an alternate end embodiment of the friction call shown in FIG. 13.

Finally, referring to FIG. 14, an alternate end cap 13b or 14b is shown without clean-out notches 47. As disclosed above, the notches are a convenience for dressing the friction surface and end caps with or without notches have little or no effect on the volume and/or tone quality produced by rubbing a striker rod across the friction strip.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

I claim:

1. A multi-voiced friction call comprising:
   a) a box frame having spaced apart side-pieces that extend between a first end cap and a second end cap;
   b) a top sounder board extending between and supported by said spaced apart side-pieces, said top sounder board positioned within said box frame to provide a first opening between a first unsupported end of said top sounder board and said first end cap and a second opening between a second unsupported end of said top sounder board and said second end cap, said first opening and said second opening communicating with a chamber defined by said box frame, said top sounder board including;
      i) a first flange fastened to one of said spaced apart side-pieces;
      ii) a second flange fastened to one of said spaced apart side-pieces opposite said first flange;
      iii) a sounder piece extending between said first flange and said second flange, said sounder piece extending in a downward direction from said first flange and said second flange into said chamber of said friction call to a position below said first opening and said second opening, said sounder piece including a friction surface that generates a simulated young turkey call in response to a striker rubbed across its surface; and
   c) a bottom sounder board extending between and supported by said spaced apart side-pieces and said spaced apart end caps, said bottom sounder board having a friction surface that generates a simulated adult turkey call in response to said striker rubbed across its surface.

2. The invention recited in claim 1 wherein said sounder piece includes a horizontal member positioned below said first opening and said second opening, said horizontal member including said friction surface that generates a simulated young turkey call in response to a striker rubbed across its surface.

3. The invention recited in claim 2 wherein said friction surface is a metal surface.

4. The invention recited in claim 3 wherein said friction surface is aluminum.

5. The invention recited in claim 2 wherein:
   a) said first end cap includes a top edge having a notch formed therein, said notch aligned with said sounder piece and extending in a downward direction from said top edge to a positioned adjacent said horizontal member that includes said friction surface; and
   b) said second end cap includes a top edge having a notch formed therein, said notch aligned with said sounder piece and extending in a downward direction from said top edge to a position adjacent said horizontal member that includes said friction surface.

6. The invention recited in claim 1 wherein each spaced apart side-piece includes:
   a) a top side-rail that extends outward from each said side-piece;
   b) a bottom side-rail spaced apart from said a top side-rail and extending outward from each said side-piece; and
   c) a panel extending along each said side-piece between said top side-rail and said bottom side rail, each said side-piece having a wall thickness T1 greater than a wall thickness T2 along said panel.

7. The invention recited in claim 6 wherein at least one of said panels extending along said spaced apart side-pieces includes a friction surface that generates a simulated wild turkey call in response to said striker rubbed across its surface.

8. An improved friction call having a friction surface that generates a simulated young turkey sound in response to a striker rubbed across its surface, said friction call comprising:
   a) a box frame having spaced apart side-pieces that extend between a first end cap and a second end cap;
   b) a top sounder board extending between and supported by said spaced apart side-pieces, said top sounder board positioned within said box frame to provide a first opening between a first unsupported end of said top sounder board and said first end cap and a second opening between a second unsupported end of said top sounder board and said second end cap, said first opening and said second opening communicating with a chamber defined by said box frame, said top sounder board including;
      i) a first flange fastened to one of said spaced apart side-pieces;
      ii) a second flange fastened to one of said spaced apart side-pieces opposite said first flange;
      iii) a sounder piece extending between said first flange and said second flange, said sounder piece extending in a downward direction from said first flange and said second flange into said chamber of said friction call to a position below said first opening and said second opening, said sounder piece including a friction surface that generates a simulated young turkey call in response to a striker rubbed across its surface.

9. The invention recited in claim 8 wherein said sounder piece includes a horizontal member positioned below said first opening and said second opening, said horizontal member including said friction surface that generates said simulated young turkey call in response to a striker rubbed across its surface.

10. The invention recited in claim 9 wherein said friction surface is a metal surface.

11. The invention recited in claim 10 wherein said friction surface is aluminum.

12. The invention recited in claim 9 wherein:
   a) said first end cap includes a top edge having a notch formed therein, said notch aligned with said sounder piece and extending in a downward direction from said top edge to a positioned adjacent said horizontal member that includes said friction surface; and
   b) said second end cap includes a top edge having a notch formed therein, said notch aligned with said sounder piece and extending in a downward direction from said top edge to a position adjacent horizontal member positioned adjacent said horizontal member that includes said friction surface.

13. The invention recited in claim 8 wherein each spaced apart side-piece includes:
   a) a top side-rail that extends outward from each said side-piece;
   b) a bottom side-rail spaced apart from said a top side-rail and extending outward from each said side-piece; and
   c) a panel extending along each said side-piece between said top side-rail and said bottom side rail, each said side-piece having a wall thickness T1 greater than a wall thickness T2 along said panel.

14. A friction call including a sound box constructed from a frame, said frame comprising:
   a) a top sounder board having a friction surface;
   b) a bottom panel;
   c) a pair of spaced apart side-pieces, each side-piece including a panel offset from, and extending between, a top rail and a bottom rail provided along opposite edges of each said side-piece;
   d) a pair of spaced apart end caps; and
   e) at least one sound hole communicating with a sound chamber formed by said frame.

15. The invention recited in claim 14 wherein said top sounder board has a length "L1" that is less than a length "L2" along each said spaced apart side-piece, said top sounder board fastened to the top rail of each side-piece, and said shorter length "L1" providing said at least one sound hole, said sound hole located between an unsupported end of said top sounder board and an end cap.

16. The invention recited in claim 15 wherein said top sounder board includes a trough extending in a downward direction from said top sounder board into said sound chamber, said trough including said friction surface.

17. The invention recited in claim 14 wherein said bottom panel is a sounder board having a friction surface different from said top sounder board.

18. The invention recited in claim 17 wherein said top sounder board produces a different sound from said bottom sounder board in response to a striker rod rubbed across the friction surface thereof.

19. There invention recited in claim 18 wherein said top sounder board generates a sound that simulates a young turkey call in response to a striker rod stimulus.

20. The invention recited in claim 18 wherein said bottom sounder board generates a sound that simulates an adult turkey call in response to a striker rod stimulus.

21. The invention recited in claim 18 comprising:
   a) a trough width to striker rod diameter ratio "W2/RØ= 2.5 ".

22. The invention recited in claim 14 wherein said top sounder board and said sound box have an equal length "L3" and said frame includes at least one end cap having a shorter height "H1" than a height "H2" to the top rail of said spaced apart side-pieces, said shorter end cap providing a sound opening below at least one unsupported end of said top sounder board.

23. The invention recited in claims 22 wherein said top sounder board includes a trough extending in a downward direction from said top panel into said sound chamber, said trough including said friction surface.

* * * * *